(12) United States Patent
Innes

(10) Patent No.: US 10,983,791 B2
(45) Date of Patent: Apr. 20, 2021

(54) PROCESSOR-IMPLEMENTED SYSTEM AND METHOD FOR VECTOR ANALYSIS TO EXTRACT A SPEED OF A ROTATING PART OF A MACHINE WHERE THERE IS NO TRIGGER SIGNAL PRESENT

(71) Applicant: Aktiebolaget SKF, Gothenburg (SE)

(72) Inventor: Simon Innes, Aberdeen (GB)

(73) Assignee: Aktiebolaget SKF, Gothenburg (SE)

( * ) Notice: Subject to any disclaimer, the term of this patent is extended or adjusted under 35 U.S.C. 154(b) by 295 days.

(21) Appl. No.: 16/115,634

(22) Filed: Aug. 29, 2018

(65) Prior Publication Data

US 2020/0073661 A1 Mar. 5, 2020

(51) Int. Cl.
| | | |
|---|---|---|
| *G06F 9/30* | (2018.01) | |
| *G06F 16/901* | (2019.01) | |
| *G06F 17/16* | (2006.01) | |
| *G06F 16/908* | (2019.01) | |

(52) U.S. Cl.
CPC ........ *G06F 9/30036* (2013.01); *G06F 16/908* (2019.01); *G06F 16/9024* (2019.01); *G06F 17/16* (2013.01)

(58) Field of Classification Search
CPC .................................................. G06F 9/30036
USPC ....................................................... 702/145
See application file for complete search history.

(56) References Cited

U.S. PATENT DOCUMENTS

| | | | | |
|---|---|---|---|---|
| 4,841,773 A | * | 6/1989 | Stewart | G01C 19/00 73/504.04 |
| 6,449,567 B1 | * | 9/2002 | Desai | G01R 31/343 318/490 |
| 2005/0137761 A1 | * | 6/2005 | Lungu | B61L 25/021 701/20 |
| 2011/0066397 A1 | * | 3/2011 | Kranz | G01C 22/02 702/141 |
| 2013/0211737 A1 | * | 8/2013 | Batcheller | G01M 7/00 702/34 |
| 2018/0047225 A1 | * | 2/2018 | Batcheller | G07C 5/008 |
| 2019/0195733 A1 | * | 6/2019 | Stansloski | G01M 13/045 |

\* cited by examiner

*Primary Examiner* — Ricky Ngon
(74) *Attorney, Agent, or Firm* — Garcia-Zamor Intellectual Property Law; Ruy Garcia-Zamor; Bryan Peckjian

(57) ABSTRACT

A processor-implemented method for vector analysis to extract a speed of a rotating part of a machine is provided. The processor-implemented method including receiving, by a processor, two channel synchronous signals derived from at least two sensors coupled to the machine and positioned 90° with respect to each other; determining, by the processor, a plurality of vector angles for a plurality of samples from the two channel synchronous signals to identify a period; determining, by the processor, a time difference based on a sample rate and a number of the plurality of samples that are within the period; determining, by the processor, the speed based on a time difference. A system for carrying out the method is also provided.

18 Claims, 4 Drawing Sheets

PROCESSOR-IMPLEMENTED SYSTEM AND METHOD FOR VECTOR ANALYSIS TO EXTRACT A SPEED OF A ROTATING PART OF A MACHINE WHERE THERE IS NO TRIGGER SIGNAL PRESENT

FIELD OF THE INVENTION

This invention relates to using vector analysis of a two channel synchronous waveform where there is no trigger signal present. In particular, this invention relates to using vector analysis of a two channel synchronous waveform where there is no trigger signal present in order to derive speeds across a period.

BACKGROUND

When carrying out transient analysis on machinery, it is normal to include a period of the machine speed from a trigger of some sort. This allows the analysing software to perform order-based analysis on the measurements to identify critical frequencies and machine behaviour during transients.

If there is no speed information available, analysis is still possible but is more difficult. In particular, for orbit plots, it is not easy to view the orbit as a transient or animate the plot to see behaviour changes against time.

The present invention solves the problem of not being able to carry out transient analysis on machinery if a speed signal is not available or was not recorded. This invention allows better analysis of machinery transients for operators who have no access to a trigger channel or have period equipment that cannot take a trigger signal.

SUMMARY

In accordance with one or more embodiments, a processor-implemented method for performing vector analysis to extract a speed of a rotating part of a machine is provided. The processor-implemented method for performing vector analysis in order to extract a speed of a rotating part of a machine includes receiving, by a processor, two channel synchronous signals derived from at least two sensors coupled to the machine and positioned 90° with respect to each other; determining, by the processor, a plurality of vector angles for a plurality of samples from the two channel synchronous signals to identify a period; determining, by the processor, a time difference based on a sample rate and a number of the plurality of samples that are within the period; and determining, by the processor, the speed based on a time difference.

In accordance with one or more embodiments of the processor-implemented method for performing vector analysis to extract a speed of a rotating part of a machine, wherein a first sample of the plurality of samples is a start point of the period, the first sample corresponding to a first angle of the plurality of vector angles.

In accordance with one or more embodiments of the processor-implemented method for performing vector analysis to extract a speed of a rotating part of a machine, wherein an end point is determined when the first angle is detected a second time within the plurality of vector angles.

In accordance with one or more embodiments of the processor-implemented method for performing vector analysis to extract a speed of a rotating part of a machine, wherein the speed results and sample points for each speed are saved into memory.

In accordance with one or more embodiments of the processor-implemented method for performing vector analysis to extract a speed of a rotating part of a machine, wherein the speed results are supplied into graph plotting routines so that they can display the speed zones and values.

In accordance with one or more embodiments of the processor-implemented method for performing vector analysis to extract a speed of a rotating part of a machine, providing controls on an application user interface to play, step forward or backward the displayed speed zones and cycles, wherein each zone is used to represent a single rotation of the rotating machine in an orbit plot.

In accordance with one or more embodiments of the processor-implemented method for performing vector analysis to extract a speed of a rotating part of a machine, further providing a reporting function so that an application can print out a list of the speeds found, listed against the time stamp of the signal samples.

In accordance with one or more embodiments of the processor-implemented method for performing vector analysis to extract a speed of a rotating part of a machine, wherein no trigger is provided in order to detect machine speed.

In accordance with one or more embodiments of the processor-implemented method for performing vector analysis to extract a speed of a rotating part of a machine, wherein the at least two sensors coupled to the machine sense vibration.

In accordance with one or more embodiments of the processor-implemented method for performing vector analysis to extract a speed of a rotating part of a machine, wherein the ability to generate a series of speed values across the period allows order-based analysis of an entire event such as a machine transient.

In accordance with one or more embodiments of the processor-implemented method for performing vector analysis to extract a speed of a rotating part of a machine, wherein the machine transient event is during one of a start-up, an overspeed, or a shut down.

In accordance with one or more embodiments of the processor-implemented method for performing vector analysis to extract a speed of a rotating part of a machine, wherein the two channel synchronous signals are derived from an Eddy-current probe, which detects gap or displacement values to a high degree of accuracy and returns an analogue electrical signal that is proportional to the gap.

In accordance with one or more embodiments of the processor-implemented method for performing vector analysis to extract a speed of a rotating part of a machine, wherein the signals are inverted, so that a positive gap results in a negative voltage.

In accordance with one or more embodiments of the processor-implemented method for performing vector analysis to extract a speed of a rotating part of a machine, further providing a data collector that digitizes the signals for storage and analysis.

In accordance with one or more embodiments of the processor-implemented method for performing vector analysis to extract a speed of a rotating part of a machine, wherein the two channel synchronous signals are derived from Piezoelectric accelerometers, and wherein the Piezoelectric accelerometers utilize analogue electrical signals proportional to acceleration.

In accordance with one or more embodiments, a system for performing vector analysis to extract a speed of a rotating part of a machine is provided. The system includes two channel synchronous signals derived from at least two sensors coupled to the machine and positioned 90° with respect to each other being received by a processor, a plurality of vector angles for a plurality of samples from the two channel synchronous signals to identify a period are determined by the processor, a time difference based on a sample rate and a number of the plurality of samples that are within the period are determined by the processor, wherein the speed based on a time difference is determined by the processor.

The system for performing vector analysis to extract a speed of a rotating part of a machine, further providing a data collector and a computer, the data collector digitizes the signals for storage and analysis and then transmits them to the computer.

The system for performing vector analysis to extract a speed of a rotating part of a machine, further providing a computer that provides a memory having software stored within and the processor.

BRIEF DESCRIPTION OF THE DRAWINGS

The invention will now be described, by way of example, with reference to the accompanying drawings, in which.

DETAILED DESCRIPTION

Figure 1:
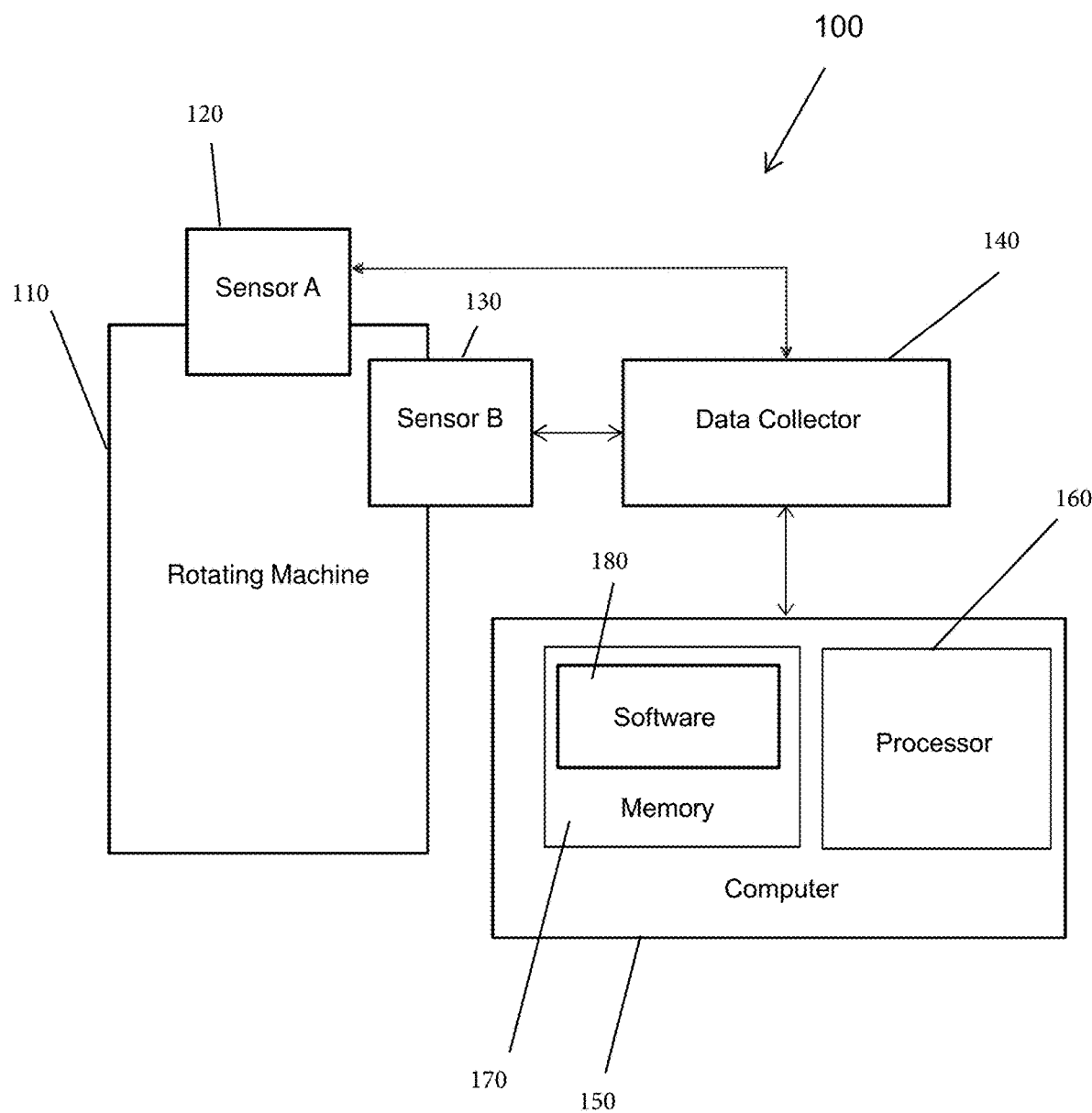
FIG. 1 depicts a block diagram of a processor-implemented system for vector analysis to extract a speed of a rotating part of a machine in accordance with one or more embodiments.

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

System for Performing Vector Analysis to Extract a Speed of a Rotating Part of a Machine FIG. 1 depicts a system 100 for performing vector analysis in order to extract a speed of a rotating part of a machine 110. The system provides the ability to generate a series of speed values across a period that allows order-based analysis of an entire event such as a machine transient when there is no trigger signal available. A machine transient event is typically during one of a start-up, an overspeed, or a shutdown condition.

The system 100 includes at least two sensors, sensor 120 and sensor 130 that are coupled to the machine 110. In addition to being coupled to the rotating machine part, the sensors 120, 130 are positioned 90° with respect to each other and are configured to sense vibration from the rotating machine part. The sensors 120, 130 are configured to emit two channel synchronous waveform signals.

One type of sensor may provide an Eddy-current probe. Here, the two channel synchronous waveform signals are derived from an Eddy-current probe, which detects gap or displacement values to a high degree of accuracy and returns an analogue electrical signal that is proportional to the gap. In this case, the signals are inverted, so that a positive gap results in a negative voltage. In an alternate embodiment, the two channel synchronous signals are derived from sensors that are Piezoelectric accelerometers. Here, the Piezoelectric accelerometers utilize analogue electrical signals proportional to acceleration.

A data collector 140 then digitizes the two channel synchronous signals derived by the sensors for storage and analysis. The system further provides a computer 150 that is configured to communicate with the data collector 140. The data collector then transmits the signals to the computer. The computer 150 provides a processor 160 and a memory 170 that includes software 180.

The at least one processor 160 can comprise one or more central processing units (CPU(s)), also referred to as processing circuits, coupled via a system bus to the at least one memory 170, at least one sensor 140, and various other components. The at least one processor 160 executes a software 180 of the system 100 for performing vector analysis. The software 180 of the system 100 may be stored in the at least one memory 180.

The at least one memory 180 can include a read only memory (ROM) and a random access memory (RAM). The ROM is coupled to the system bus and may include a basic input/output system (BIOS), which controls certain basic functions of the system. The RAM is read-write memory coupled to the system bus for use by the at least one processor 160. The at least one memory 180 is an example of a tangible storage medium readable by the at least one processor 160, where the software 180 is stored as instructions for execution by the at least one processor 160 to cause the system 100 for performing vector analysis to operate, such as is described herein.

Figure 2:
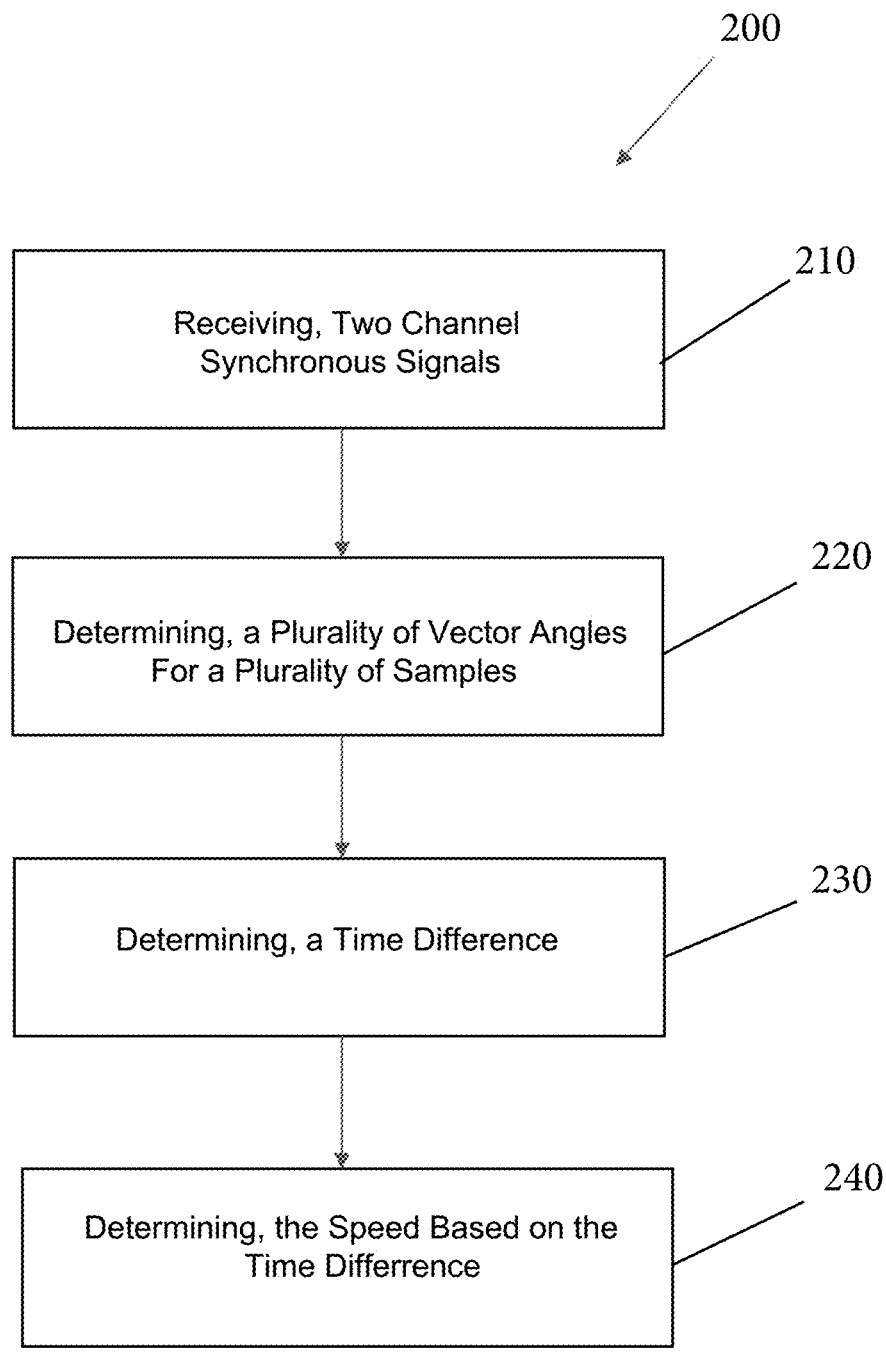
FIG. 2 depicts a process flow of a processor-implemented method for vector analysis to extract a speed of a rotating part of a machine in accordance with one or more embodiments.

Processor-Implemented Method for Vector Analysis to Extract a Speed of a Rotating Part of a Machine FIG. 2 depicts a process flow 200 of the processor-implemented method for vector analysis to extract a speed of a rotating part of a machine where no trigger is provided. In step 210 of the method, the processor receives two channel synchronous signals derived from at least two sensors that are coupled to the machine and positioned 90° with respect to each other. In step 220 of the method, the processor determines, a plurality of vector angles for a plurality of samples from the two channel synchronous signals to identify a period. In step 230 of the method, the processor determines a time difference based on a sample rate and a number of the plurality of samples that are within the period. In step 240 of the method, the processor determines the speed based on a time difference.

Figure 3:
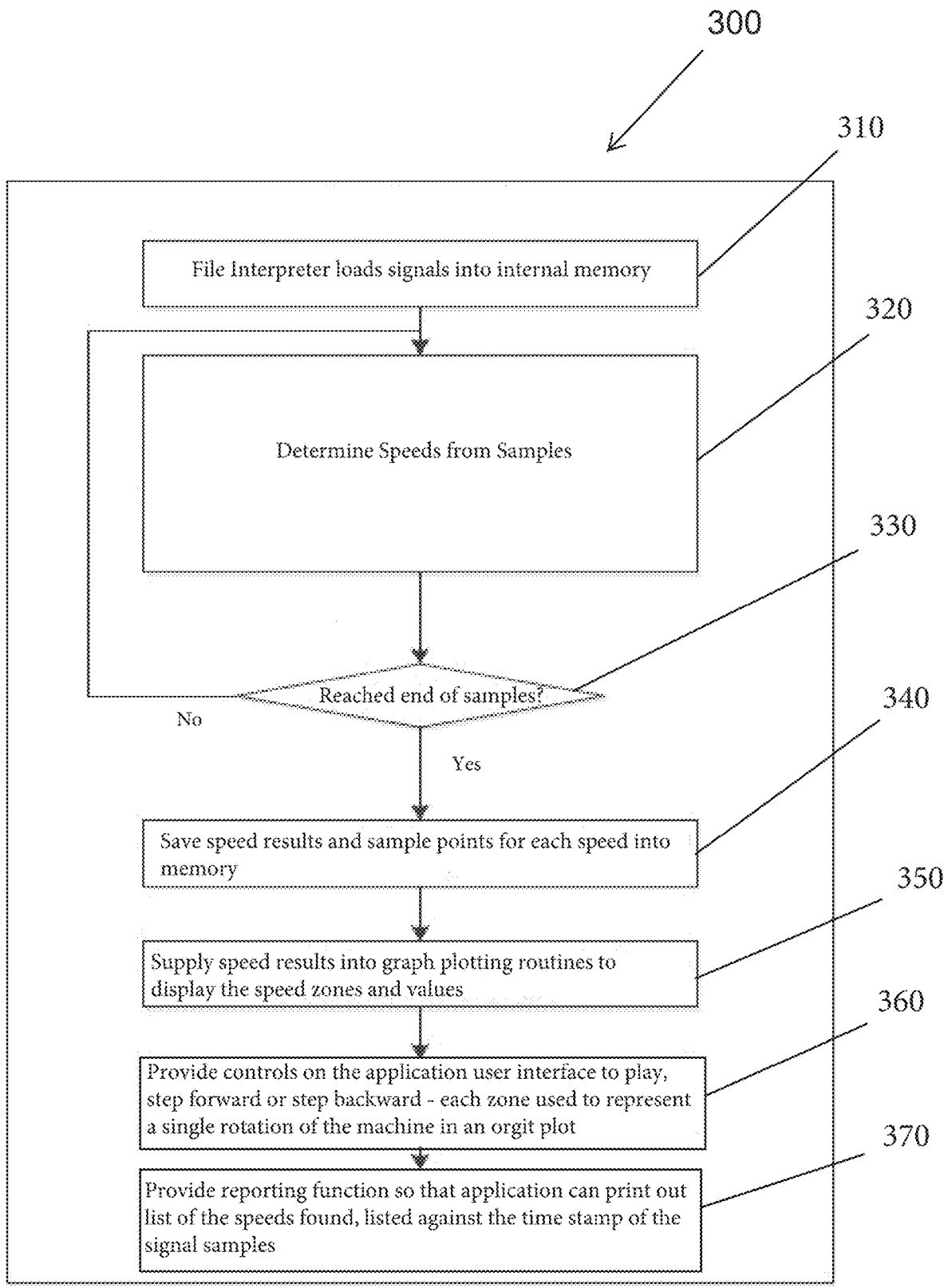
FIG. 3 depicts a flow diagram of a processor-implemented method for vector analysis to extract a speed of a rotating part of a machine in accordance with one or more embodiments.

FIG. 3 depicts a flow diagram 300 of the processor-implemented method for vector analysis to extract a speed of a rotating part of a machine where no trigger is provided.

In step 310 a file interpreter (Wav, CSV) loads signals into the internal memory 180.

In step 320 the speeds are calculated. Assuming the two waveforms are synchronous and come from sensors that are at 90° to one another (previously disclosed), then by calculating the vector angle formed by the two signals, the software can determine the start and end of each rotation of the machine.

This is done by computing the vector angle at the start, then analyzing the following series of samples to determine when the angle has done a full rotation and the vector has reached or passed the start position. The time difference between these two points then gives the rotational speed of the machine and provides a zone of samples that can be plotted by the software when animating the data as an orbit plot.

The analysis then proceeds for the length of the period, allowing order-based analysis of an entire event such as a machine transient until an end of the samples are reached.

Step 330 depicts a decision block where the question is whether the end of the samples been reached.

If the end of the samples is not reached, the process is directed back to compute the next set of samples.

The end of the samples are reached when an end point of the period is reached. The end point of the period is determined when the first angle is detected a second time within the plurality of vector angles.

Step 340 depicts the speed results and sample points for each speed being saved into memory.

Step 350 depicts the speed results being supplied into graph plotting routines so that they can display the speed zones and values.

Figure 4:
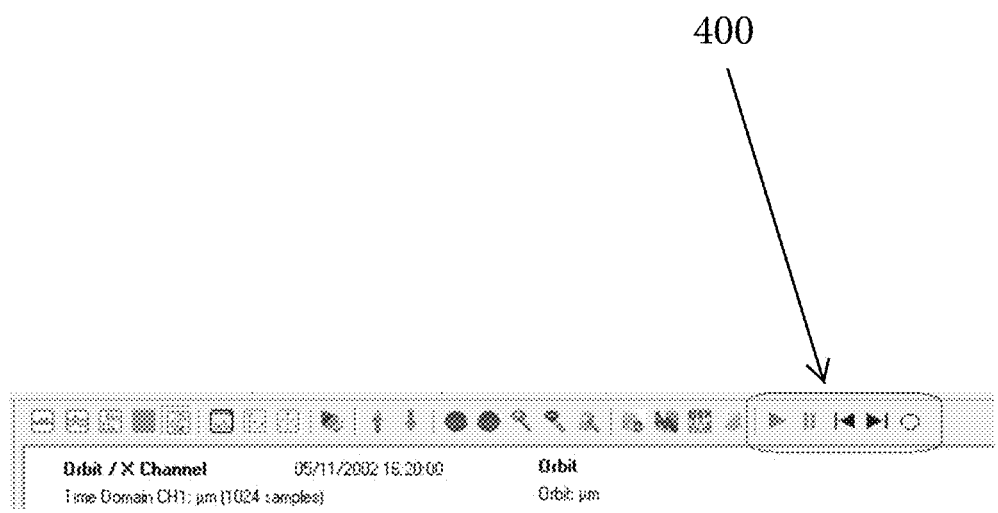
FIG. 4 depicts a program toolbar including player controls in accordance with one or more embodiments.

Step 360 depicts the controls being provided on an application user interface to play, step forward or backward the displayed speed zones and cycles, wherein each zone is used to represent a single rotation of the rotating machine in an orbit plot. See element 400 in FIG. 4.

Step 370 depicts the processor-implemented method further including providing a reporting function so that an application can print out a list of the speeds found, listed against the time stamp of the signal samples.

The following code depicts an example embodiment of the present invention:

```
procedure TPmData.ComputeOrbitZones;
function CrossingOverZero(const Before,After: Real): Boolean;
begin
Result := ((Before < 0) and (After > 0)) or ((Before > 0) and (After < 0));
end;
var
CyclePoints: TIntegerArray;
A,B: TPmRecord;
Sample,CycleStart,Cycle: Integer;
StartAngle,CurrentAngle,PreviousAngle: Real;
PositiveGoing,CycleCrossOver: Boolean;
begin
// Initialise...
// Count := 0;
CycleStart := 0;
Cycle := 0;
// Get the two records to use...
A := RecordList [0];
B := RecordList [1];
// Find the angle represented by the opening sample...
StartAngle := Angle360 (B.YValue (0), A.YValue (0));
//Find the next angle so we can determine if it is positive going...
CurrentAngle := Angle360 (B.YValue (1), A.YValue (1));
// Take account of possible crossing over the positive x-axis...
if CrossingOverZero (StartAngle, CurrentAngle) then
PositiveGoing := CurrentAngle < StartAngle
else
PositiveGoing := CurrentAngle > StartAngle;
// Set comparator in loop...
PreviousAngle := CurrentAngle;
// First we find the span of the first cycle, beginning at the next sample...
for Sample := 1 to Pred (FirstRecord.NumberOfLines) do
begin
// Get the angle...
CurrentAngle := Angle360 (B.YValue (Sample), A.YValue (Sample));
// If the previous angle is less than the start one (positive going) and
// the new angle is more than the start one, we have completed a cycle;
// for negative going, it is the reverse...
if PositiveGoing then
begin
// Check if we are passing the start point vector angle; also...
// check for cross over of the x-axis...
if CrossingOverZero (PreviousAngle, CurrentAngle) then
CycleCrossOver := (PreviousAngle - 360 < StartAngle)
and (CurrentAngle >= StartAngle)
else
CycleCrossOver := (PreviousAngle < StartAngle) and (CurrentAngle >= StartAngle);
end
else
begin
// Check if we are crossing over zero...
if CrossingOverZero (PreviousAngle, CurrentAngle) then
CycleCrossOver := (PreviousAngle + 360 > StartAngle)
and (CurrentAngle <= StartAngle)
else
CycleCrossOver := (PreviousAngle > StartAngle) and (CurrentAngle <= StartAngle);
end;
```

```
// If we found the end of the cycle, note values marking the cycle
// start (note we are always logging the start, so the first one is zero)...
ifCycleCrossOver then
begin
// If this is the first, set the length of the result array on an initial
// estimate...
if Cycle = 0 then
SetLength (CyclePoints, A.NumberOfLines div Sample* 5);
// Store the sample point...
CyclePoints [Cycle] := CycleStart;
// Count...
Inc (Cycle);
// Safety check...
if Cycle > Length (CyclePoints) then
SetLength (CyclePoints, Cycle + 10);
// Reset the start...
CycleStart := Sample;
end;
// Record the current angle for the next comparison...
PreviousAngle := CurrentAngle;
end;
// Once done, resize the results array...
SetLength (CyclePoints, Cycle);
// Place them into the first record...
A.TriggerPoints := CyclePoints;
end; // of procedure TPmData.ComputeOrbitZones
```

Function Angle converts from radians (the output of the ArcTan function) into degrees, then adjusts the angle value to be in the range 0-360.

The code computes the angle at the first (index 0) sample pair, and the second (index 1).

It then uses function CrossingOverZero to determine if the angle is going positive (increasing) or negative (decreasing).

The code then scans forward through the sample arrays until the original angle is passed, using the following logic:

If the previous angle is less than the start one (positive going) and the new angle is more than the start one, we have completed a cycle; for negative going, it is the reverse.

Once a cycle is found, its range (start and end) are stored in memory (CyclePoints array) and the scan continues to search for the next one, until we reach the end of the samples.

The results are then stored in the parent TPmData object (a business object which handles one or more channels of measurements).

In view of the above, embodiments disclosed herein may include a system, method, and/or computer program product that uses vector analysis of a two channel synchronous waveform where there is no trigger signal present in order to derive speeds across a period of a rotating part of a machine.

Technical effects and benefits of this system include the ability to generate a series of speed values across the duration of a period of machinery vibration in order to better carry out transient analysis of machinery events such as at startup, overspeed and shut down. Additionally, the embodiments of the invention provide the ability to animate graphical plots, especially in orbit form (X vs Y plotted in a polar fashion).

The embodiments of the invention further enable accurate data acquisition of machine speeds out in the field with just a data collector, sensors and computer. This is because an expensive oscilloscope with an internal trigger would typically be required but would be cumbersome and impractical (because of its size) to take into the field. Hand held data acquisition devices are designed to be used in the field and are built durably to do so. An expensive bulky $20,000 oscilloscope with an internal trigger that is designed to be used in a laboratory would not be practical.

Thus, embodiments of this system described herein are necessarily rooted in a computer processor having inventive software to perform proactive operations to overcome problems specifically arising in the realm of Machine Health. Specifically, they allow a technician to check the health of a rotating machine part that might otherwise result in a catastrophic failure, which would result in unwanted costs and expenses.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A processor-implemented method for vector analysis to extract a speed of a rotating part of a machine, the processor-implemented method comprising:
   receiving, by a processor, two channel synchronous signals derived from at least two sensors coupled to the machine and positioned 90° with respect to each other;
   determining, by the processor, a plurality of vector angles for a plurality of samples from the two channel synchronous signals to identify a period;
   determining, by the processor, a time difference based on a sample rate and a number of the plurality of samples that are within the period;
   determining, by the processor, the speed based on a time difference.

2. The processor-implemented method of claim 1, wherein a first sample of the plurality of samples is a start point of the period, the first sample corresponding to a first angle of the plurality of vector angles.

3. The processor-implemented method of claim 2, wherein an end point is determined when the first angle is detected a second time within the plurality of vector angles.

4. The processor-implemented method of claim 1, wherein the speed results and sample points for each speed are saved into memory.

5. The processor-implemented method of claim 4, wherein the speed results are supplied into graph plotting routines so that they can display the speed zones and values.

6. The processor-implemented method of claim 5, further comprising providing controls on an application user interface to play, step forward or backward the displayed speed zones and cycles, wherein each zone is used to represent a single rotation of the rotating machine in an orbit plot.

7. The processor-implemented method of claim 6, further comprising providing a reporting function so that an application can print out a list of the speeds found, listed against the time stamp of the signal samples.

8. The processor-implemented method of claim 1, wherein no trigger is provided in order to detect machine speed.

9. The processor-implemented method of claim 1, wherein the at least two sensors coupled to the machine sense vibration.

10. The processor-implemented method of claim 1, wherein the ability to generate a series of speed values across the period allows order-based analysis of an entire event such as a machine transient.

11. The processor-implemented method of claim 10, wherein the machine transient event is during one of a start-up, an overspeed, or a shut down.

12. The processor-implemented method of claim 10, wherein the two channel synchronous signals are derived from an Eddy-current probe, which detects gap or displacement values to a high degree of accuracy and returns an analogue electrical signal that is proportional to the gap.

13. The processor-implemented method of claim 12, wherein the signals are inverted, so that a positive gap results in a negative voltage.

14. The processor-implemented method of claim 12, further comprising a data collector that digitizes the signals for storage and analysis.

15. The processor-implemented method of claim 12, wherein the two channel synchronous signals are derived from Piezoelectric accelerometers, and wherein the Piezoelectric accelerometers utilize analogue electrical signals proportional to acceleration.

16. A system for performing vector analysis to extract a speed of a rotating part of a machine, the system comprising:
    two channel synchronous signals derived from at least two sensors coupled to the machine and positioned 90° with respect to each other being received by a processor,
    a plurality of vector angles for a plurality of samples from the two channel synchronous signals to identify a period are determined by the processor,
    a time difference based on a sample rate and a number of the plurality of samples that are within the period are determined by the processor, wherein
    the speed based on a time difference is determined by the processor.

17. The system for performing vector analysis to extract a speed of a rotating part of a machine according to claim 16, further comprising a data collector and a computer, the data collector digitizes the signals for storage and analysis and then transmits them to the computer.

18. The system for performing vector analysis to extract a speed of a rotating part of a machine according to claim 17, further comprising a computer that provides a memory having software stored within and the processor.

* * * * *